N. A. HANSEN, J. F. LEHMANN & N. JENSEN.
PLASTERER'S HAWK.
APPLICATION FILED JAN. 7, 1908. RENEWED APR. 11, 1910.
963,143.
Patented July 5, 1910.
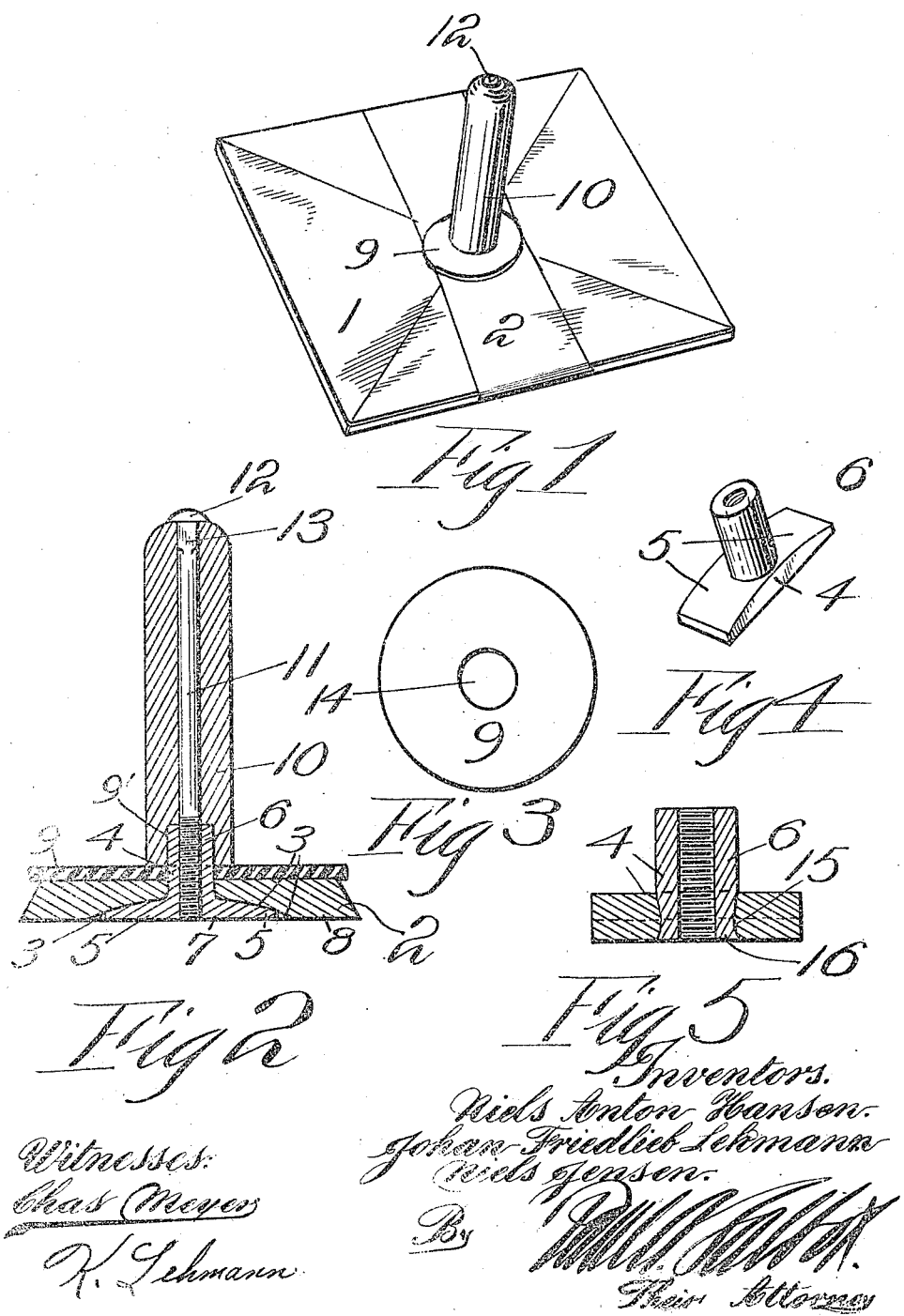

UNITED STATES PATENT OFFICE.

NIELS ANTON HANSEN, JOHAN FRIEDLIEB LEHMANN, AND NIELS JENSEN, OF SEATTLE, WASHINGTON.

PLASTERER'S HAWK.

963,143.　　　Specification of Letters Patent.　　Patented July 5, 1910.

Application filed January 7, 1908, Serial No. 409,735. Renewed April 11, 1910. Serial No. 554,864.

*To all whom it may concern:*

Be it known that we, NIELS ANTON HANSEN, (who has declared his intention of becoming a citizen of the United States,) JOHAN FRIEDLIEB LEHMANN, a citizen of the United States, and NIELS JENSEN, a subject of the King of Denmark, residents of Seattle, in the county of King and State of Washington, have invented a new and useful Plasterer's Hawk, of which the following is a clear and concise specification.

Our invention relates to a plasterer's hawk in which the cleat is provided with a flanged nut adapted to reduce the weight of the hawk as well as to increase the length of the thread of the nut and to prevent the cleat from splitting.

The objects of our invention are to provide a hawk reinforced by a dove-tailed cleat having a nut for securing the handle and having a portion thereof projected upwardly and into said handle; to provide a handle for a plasterer's hawk detachably secured thereto by means of a carriage bolt adapted to engage a nut having a thread substantially longer than the thickness of a cleat supporting said nut; to provide a plasterer's hawk having a pad surrounding the handle thereof; to provide a plasterer's hawk having a nut adapted to fit the curved depression provided in the back thereof and formed by a dado cutter; and to provide a handle for plasterers' hawks adapted to secure a pad therebetween and surrounding said handle. We accomplish these as well as minor objects by the construction now preferred by us and illustrated in the accompanying drawings in which—

Figure 1 is a perspective view of our device; Fig. 2 is a transverse section of the cleat and handle of our device; Fig. 3 is a plan view of the pad of our device; Fig. 4 is a perspective view of the nut of our device; and Fig. 5 is a transverse section of a modification of our device.

Similar reference numerals refer to similar parts throughout the several views of our device as illustrated in the accompanying drawings.

Our device consists of a table 1 having a cleat 2 which is provided with angularly disposed sides forming a dove-tailed and snugly fitting a like shaped recess in said table 1. A depression or curviform recess 3 is formed by a dado cutter or other device for forming notches and grooves transversely in the surface adjacent said table, thus fitting the nut 4 having the flanged projections 5 which are substantially thinner at the extremities thereof than at the point of juncture with the cylindrical projection 6. The face 7 of said nut 4 is flush with the surface 8 of said cleat which rests against the bottom of the dove-tailed recess formed in the back of said table 1. Said cylindrical projection 6 is of sufficient length to extend substantially through said cleat and through the pad 9 and into the recess 9' in the handle 10 which is provided with a carriage bolt 11 having a button head 12 and a square portion 13 adapted to prevent said bolt 11 from turning in said handle 10, thus facilitating the screwing of the opposite end of said bolt into said nut 4. It is obvious that by this construction the handle 10 may be frequently removed and in view of the extreme length of the threaded portion of said bolt 11 the threads will not be damaged by wear before the rest of the device has lost its usefulness. It is also obvious that either the handle or said pad 9 may be removed for shipping or packing as said pad 9 is preferably held in place by screwing said handle down, holding said pad between the end thereof and the back of said cleat 2, the aperture 14 is provided in said pad fitting the cylindrical projection 6 of said nut 4. In Fig. 5 we have shown a construction by which said nut 4 may be manufactured through the drop forging process in which said cylindrical projection 6 is forced into an aperture in the flanged projecting portion 5 and is then upset on the end 16 thereof. It is obvious that in the manufacture of said nuts 4 of our device numerous methods may be employed, such as forging and casting in different metals.

We do not wish to be limited to the specific construction herein set forth but wish to depart from such details as are within the scope of our patent.

Having thus described our invention, what we claim as new and desire to secure by Letters Patent of the United States, is;

1. In a plasterer's hawk, a table, a cleat secured to the back thereof and provided with a curviform recess on the face adjacent said table and a nut having a flange which is flat on the face and curved on the back to conform to said curviform recess, whereby said flange is strengthened by reason of its shape.

2. In a plasterer's hawk, a table, a cleat secured thereto, a handle secured to said cleat, a pad surrounding said handle and secured thereby to said cleat, and a flanged nut provided in said cleat and projecting therethrough and through said pad and into a recess in said handle whereby the surface of said table is unbroken.

3. In a plasterer's hawk, a table, a nut having a flange which is flat on the face and curved on the back whereby said flange is strengthened by reason of its shape and a cleat secured to the back of said table and provided with a curviform recess on the face adjacent said table and conforming to the shape of the back of said flange.

In testimony whereof we have signed our names to this specification in the presence of two subscribing witnesses.

NIELS ANTON HANSEN.
JOHAN FRIEDLIEB LEHMANN.
NIELS JENSEN.

Witnesses:
PAUL A. TALBOT,
K. LEHMANN.